United States Patent
Kühnel et al.

(10) Patent No.: US 7,546,828 B2
(45) Date of Patent: Jun. 16, 2009

(54) THROTTLE BODY ASSEMBLY FOR AN INTERNAL COMBUSTION ENGINE

(75) Inventors: Hans-Ulrich Kühnel, Mönchengladbach (DE); Dieter Thönneßen, Viersen (DE); Michael Sanders, Kaarst (DE)

(73) Assignee: Pierburg GmbH, Neuss (DE)

( * ) Notice: Subject to any disclaimer, the term of this patent is extended or adjusted under 35 U.S.C. 154(b) by 0 days.

(21) Appl. No.: 11/862,112

(22) Filed: Sep. 26, 2007

(65) Prior Publication Data
US 2008/0072873 A1    Mar. 27, 2008

(30) Foreign Application Priority Data
Sep. 26, 2006    (DE) .................. 10 2006 045 420

(51) Int. Cl.
*F02D 9/08*    (2006.01)
*F02D 9/10*    (2006.01)

(52) U.S. Cl. ...................... 123/337; 123/305
(58) Field of Classification Search ............. 123/336, 123/337, 399; 251/305, 306, 307
See application file for complete search history.

(56) References Cited

U.S. PATENT DOCUMENTS

| | | | | |
|---|---|---|---|---|
| 3,475,007 | A | | 10/1969 | Fawkes |
| 3,945,398 | A | | 3/1976 | Masheder |
| 4,284,264 | A | * | 8/1981 | Hubertson .................. 251/305 |
| 4,601,459 | A | * | 7/1986 | Verdelet ..................... 251/306 |
| 4,634,097 | A | * | 1/1987 | Hubertson .................. 251/173 |
| 4,770,393 | A | * | 9/1988 | Hubertson .................. 251/306 |
| 4,860,706 | A | * | 8/1989 | Suzuki et al. ............... 123/337 |
| 5,158,265 | A | | 10/1992 | Miyairi |
| 5,181,690 | A | | 1/1993 | Gonsior |
| 6,138,640 | A | * | 10/2000 | Asanuma et al. ............. 123/337 |
| 2005/0120556 | A1 | | 6/2005 | Arai et al. |
| 2006/0038151 | A1 | * | 2/2006 | Nakamura .................. 251/305 |

FOREIGN PATENT DOCUMENTS

| | | |
|---|---|---|
| DE | 2 023 960 | 11/1971 |
| DE | 691 05 821 T2 | 8/1995 |
| DE | 198 40 887 A1 | 3/2000 |
| DE | 199 09 982 A1 | 9/2000 |
| DE | 103 53 431 A1 | 6/2005 |
| DE | 10 2004 053 579 A1 | 7/2005 |

(Continued)

OTHER PUBLICATIONS

European Search Report issued in corresponding application No. EP 07 11 3680, completed Sep. 24, 2007 and mailed Oct. 1, 2007.

(Continued)

*Primary Examiner*—Mahmoud Gimie
(74) *Attorney, Agent, or Firm*—Griffin & Szipl, P.C.

(57) ABSTRACT

The invention relates to a throttle plate port whose pivot axis is disposed so as to be axially offset with respect to the throttle plate and whose radial peripheral surface is shaped, at least by sections, in the form of spherical sectors, where in the position which closes the bore the peripheral surface of the throttle plate abuts, in the form of a line, the seat face of the housing. Through this type of eccentric disposition and simultaneous realization of the peripheral surface, the housing can be realized without undercuts and nonetheless precise dosing can be achieved in the case of small pivot angles.

6 Claims, 3 Drawing Sheets

FOREIGN PATENT DOCUMENTS

| | | |
|---|---|---|
| DE | 10 2005 023 613 B3 | 9/2006 |
| EP | 0 471 270 A1 | 2/1992 |
| EP | 0 482 272 B1 | 4/1992 |
| GB | 2 092 714 A | 8/1982 |
| JP | 61252971 | 11/1986 |
| WO | 03/019055 A1 | 3/2003 |

OTHER PUBLICATIONS

Office Action issued in corresponding German application No. DE 10 2006 045 420.0, issued Oct. 11, 2006.

German Office Action issued in corresponding German Office Action No. 10 2006 045 420.0 dated Jan. 30, 2009.

\* cited by examiner

THROTTLE BODY ASSEMBLY FOR AN INTERNAL COMBUSTION ENGINE

This application claims priority from German Patent Application No. 10 2006 045 420.0, filed Sep. 26, 2006, the entire disclosure of which is incorporated herein by reference.

FIELD OF THE INVENTION

The invention relates to a throttle body assembly for an internal combustion engine, said throttle body assembly comprising a housing in which a bore is formed through which a fluid can flow and in which a throttle plate is disposed which can be pivoted about a pivot axis which divides the throttle plate into two throttle blades, where, via a positioning device, the throttle plate can be set in a pivoting motion, whereby the throttle plate can be pivoted to abut a seat face which is formed by an inner wall of the housing and whereby the throttle plate can be pivoted away from said seat face.

BACKGROUND OF THE INVENTION

Throttle body assemblies of this type can fulfill different functions in an internal combustion engine. In particular, throttle plate ports for regulating the amount of intake air must be mentioned here but also exhaust gas flaps, radiator bypasses, exhaust gas recycling valves, or intake manifold flaps can also be constructed in this manner. In this connection the demand for as tight as possible a closure of the bore through which fluid flows by the corresponding throttle plate is constantly growing in the field of modern internal combustion engines. In order to achieve a tight closure of this type it is a known practice, for example, to machine the housing and the plates very precisely or also to spray the throttle plate or the valve seat with sealants or to provide them with a sealing ring. However, this requires much time and effort in production and is thus associated with high costs.

Accordingly, EP 0 482 272 B1 discloses a throttle body assembly whose parts are injection-molded in sequence in the same mold, where in said throttle body assembly the plate is injected in the closed state, i.e. with its entire periphery abutting the outer housing. Thereby an optimized tightness is supposed to be achieved by the plate in the bore without additional components and without additional processing having to be carried out.

Furthermore, it is a practice known from DE 10 2005 023 613 B3 to produce a throttle plate port by injection-molding it with other parts of the throttle body assembly in sequence in the same mold in such a manner that the housing lying outside is made to be as rotationally symmetric as possible, whereby warping of the outer housing upon the action of heat is avoided. In this way a high degree of closure of the bore can also be achieved with injection of the throttle plate and the throttle plate shaft in the opened state.

However, these plates which are injection-molded with other parts in sequence in the same mold have the disadvantage that control of the amount of fluid, in particular in the case of small angles of displacement from the closed state, is possible only with difficulty since even with a small opening angle a relatively large free cross-sectional surface arises. Thus for other applications, in particular for throttle plate ports made of metal, different measures are known for improving the characteristic lines of the plates in this range. In particular, spherical zones at the housing are produced here. Producing spherical zones of this type is, however, not possible in the case of the known throttle plate ports which are injection-molded with other parts in sequence in the same mold due to the presence of undercuts and thus the impossibility of carrying out the ejection.

SUMMARY OF THE INVENTION

Thus it is the objective of the invention to provide a throttle body assembly which on the one hand makes possible a tight closure of the bore by the plate without additional components and on the other hand can be produced with the economical injection-molding process in which the parts of the throttle body assembly are molded in sequence in the same mold, where measures forming the characteristic lines at the housing are intended to be realized, in particular without additional machining of the housing.

This objective is realized by the fact that the pivot axis is disposed so as to be axially offset with respect to the throttle plate so that in opening the bore a first throttle blade pivots in the direction away from a cross section of the bore that runs through the pivot axis and a second throttle blade pivots in the direction towards a cross section of the bore that runs through the pivot axis, where a radial peripheral surface of the throttle plate is formed, at least by sections, in the form of a spherical sector so that in the position which closes the bore the throttle plate's entire peripheral surface in the form of a spherical sector abuts the seat face of the housing. By axially offsetting the shaft with respect to the throttle plate and simultaneously giving the peripheral surface the form of a spherical sector it becomes possible to obtain a tight closure over the periphery of the throttle plate, where the throttle plate with the shaft or corresponding stub shafts in the housing can be injection-molded with other parts of the throttle body assembly in sequence in the same mold since through a construction of this type any undercuts can be avoided and thus ejection becomes possible.

In a form of embodiment extending beyond this the cross section of the bore through which fluid flows widens in one section in the axial direction from the seat face to the pivot axis. Then if a following narrowing of the bore is omitted, a simple ejectability during the injection-molding of the housing results since the cross section of the bore widens to one side. Furthermore, through this measure it is ensured that there is no previous contact of the throttle plate body with the inner wall of the housing.

In a form of embodiment extending beyond this the cross section of the bore widens in one section on a side of the throttle plate in the closed state, specifically the side diametrically opposite to the pivot axis, in the direction of the pivot axis on the side of the first blade. This leads to a good adjustability of the amount of fluid in the slightly opened state of the throttle plate.

Preferably the aforementioned sections correspond to the area traversed in the axial direction during the pivoting motion of the throttle plate from the closed position by a pivot angle of 10°. By such a measure, with corresponding design, the precise dosing of the stream of fluid is achieved even in the case of a small pivot angle of the plate from the closed state. The function of a spherical zone known from other applications is achieved thereby.

Preferably the throttle plate with a shaft or two diametrically opposite stub shafts in the housing forming the bore is injection-molded with the other parts of the throttle body assembly in sequence in the same mold in the at least partially opened state. A device of this type has a high degree of tightness in the area of the bearing and can be produced economically.

In an extending form of embodiment the pivot axis is initially disposed so as to be radially offset with respect to the throttle plate. There is thus a double eccentricity of the plate with respect to the shaft. Even in the case of such an embodiment it is possible to form the bore so that an ejection of the housing during injection-molding is ensured.

In an extending form of embodiment the throttle plate in the closed position is disposed so as to be perpendicular to the bore axis so that the entire 90° pivot angle is available for adjusting the desired magnitude of the fluid stream.

In a preferred embodiment the throttle plate is produced as one piece with two stub shafts which are mounted in two bearings of the housing, where the stub shafts are formed in such a manner that the throttle plate with sections of the stub shafts, specifically the sections lying in the bore, is shaped essentially in the form of a U with one cut along a cutting plane which is at the level of the pivot axis and perpendicular through the throttle plate. Through an embodiment of this type the resistance to flow of the throttle body assembly in the opened or partially closed state is reduced.

Through these measures a throttle body assembly is provided which ensures a tight closure in the closed position of the throttle plate and at the same time ensures high precision in the regulation of the stream of fluid without having undercuts in the form of the housing.

BRIEF DESCRIPTION OF THE DRAWINGS

Two embodiment examples of throttle body assemblies according to the invention are represented in the drawings and described in the following.

DETAILED DESCRIPTION OF THE ILLUSTRATIVE EMBODIMENTS

Each of the throttle body assemblies according to the invention and represented in FIGS. 1 to 9 comprises a housing 1 where the housing is formed to be essentially rotationally symmetric and the housing comprises, formed in its interior, a bore 2 which passes through the housing 1 and through which a fluid can flow. A two-blade throttle plate 3 which can be pivoted about a pivot axis 4 is disposed in this bore 2 through which fluid flows.

Figure 1:
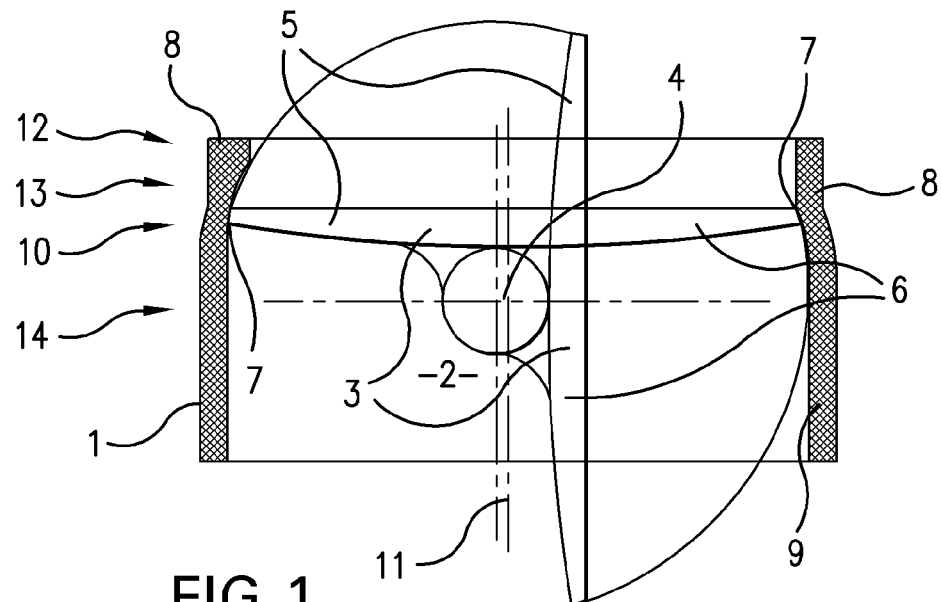
FIG. 1 shows a side view of a first throttle body assembly according to the invention and in a sectioned representation, where the completely closed position, the completely opened position, and the contour line of the plate motion are represented in the figure.

In FIG. 1 the throttle plate 3 is represented in the position in which it completely closes the bore 2 as well as in the position in which it completely opens said bore. Furthermore, the contour of the line of motion during opening is represented.

The throttle plate 3 comprises a first blade 5 and a second blade 6, which are disposed in the representation to the left or to the right of the pivot axis 4 so that when the throttle plate 3 pivots from the closed position the first blade 5 corresponding to FIG. 1 is pivoted in the upwards direction and the second blade 6 is pivoted in the downwards direction, i.e. with respect to the pivot axis.

In the present embodiment example the two blades 5, 6 thus consist of two circular sectors which together form a circular shape of uniform diameter since the pivot axis 4 is disposed in the bore so as to be axially offset with respect to the throttle plate 3 and also radially offset with respect to the center of the throttle plate 3. The throttle plate 3 has a radial peripheral surface 7 which is shaped in the form of a spherical sector. This means that the radial peripheral surface 7 has a radius which, for example, can be based approximately in the area of the pivot axis 4 of the throttle plate 3. Other radii can also be chosen for the peripheral surface 7 with appropriate adaptation of the housing 1, where, seen from the center of the throttle plate 3, the periphery of the throttle plate 3 on the side farther from the pivot axis 4 must always be smaller than on the side of the throttle plate 3 nearer to the pivot axis.

In the state in which the bore 2 is closed the throttle plate 3 lies with its radial peripheral surface 7 abutting a seat face 8 which is formed by an inner wall 9 of the housing 1 forming the bore 2. In particular in FIGS. 2 and 3 it can be seen that this is a linear contact between the seat face 8 and the peripheral surface 7.

Figure 2:
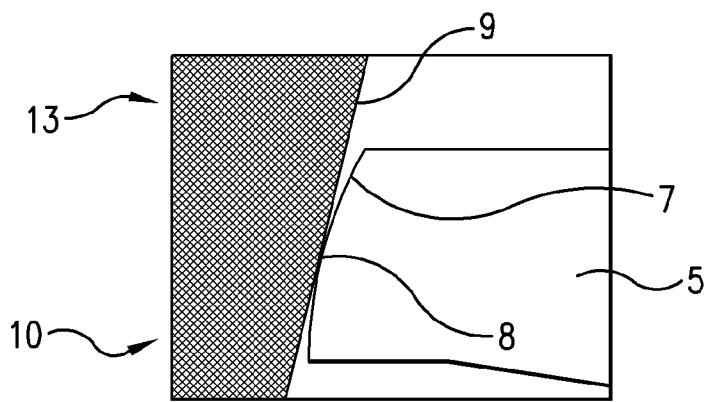
FIG. 2 shows an extract of the first throttle blade of the throttle body assembly from FIG. 1, where said throttle blade is in the closed position.
Figure 3:
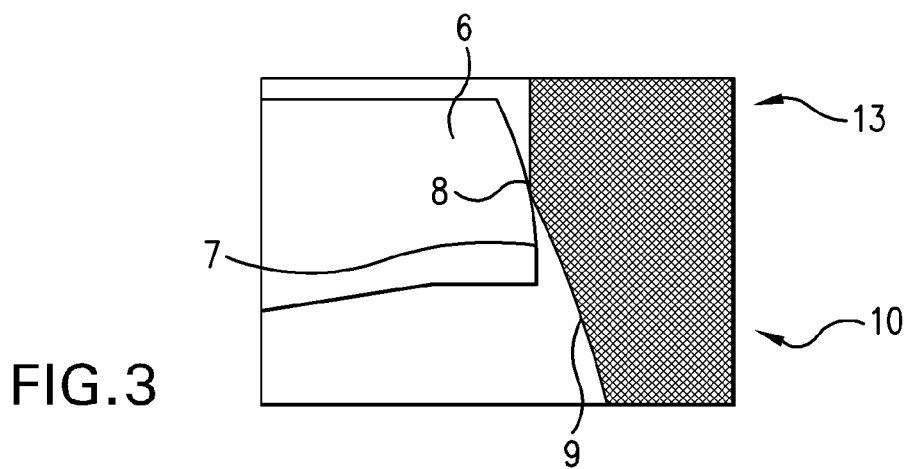
FIG. 3 shows the corresponding extract of the diametrically opposite throttle blade of the throttle body assembly from FIG. 1, where said throttle blade is in the closed position.

In FIGS. 2 and 3 it is furthermore represented how the radial peripheral surface 7 moves away from the inner wall 9 of the housing 1 as the throttle plate 3 pivots. In order to be able to ensure this type of motion of the second blade 6 the bore 2 comprises a section 10 with a cross section widening in the direction of the pivot axis 4. That this is necessary for the motion of the throttle plate 3 becomes clear in particular from FIG. 3 since the second blade 6, as it pivots in the range of the first pivot angle, initially moves slightly away from a bore axis 11. The widening section 10 in the area of the second blade 6 should be formed in particular so that a precise adjustment of the fluid stream is achieved when the blade 6 pivots, thus the function of the spherical zone of a known throttle plate port is reproduced. The section 10 extends approximately from the seat face 8 up to the level of the pivot axis 4, which should correspond at least to an area which is swept over in the axial direction when the throttle plate 3 is pivoted from its closed position by ca. 10°.

The bore 2 through which fluid flows accordingly has, for reliable functionality but also for precise control of the amount of fluid put through, sections with cross sections widening to different extents. In an area of the throttle plate 3, specifically the area diametrically opposite to the pivot axis 4, the bore first has a first section 12 with a narrower cross section. This first section initially widens slightly in a second section 13 on the side nearer to the first blade 5 in the direction of the pivot axis 4 while a side of the bore 2, specifically the side nearer the blade 6, continues to be bounded by as substantially straight a wall as possible. This section 13 serves in particular to ensure a precise dosing of the conveyed amount of fluid for pivot angles of up to at least 10° from the closed position of the throttle plate 3 and thus in turn the same function as the throttle plate ports' spherical zones known from other applications. This section 13 is bounded by the seat face 8 which the throttle plate 3, or its radial peripheral surface 7, abuts in the closed state.

The previously described, widening third section 10 follows, in the direction of the pivot axis 4, the seat face 8, where said section must be formed in particular on the side facing the second blade 6. In given cases an additional widening can also occur, as in the embodiment example according to FIG. 1, on the side nearer to the first blade 5. This widening section 10 extends approximately up to the level of the pivot axis 4 and, from there, passes into a fourth section 14 which has a cross section of approximately constant size.

Figure 4:
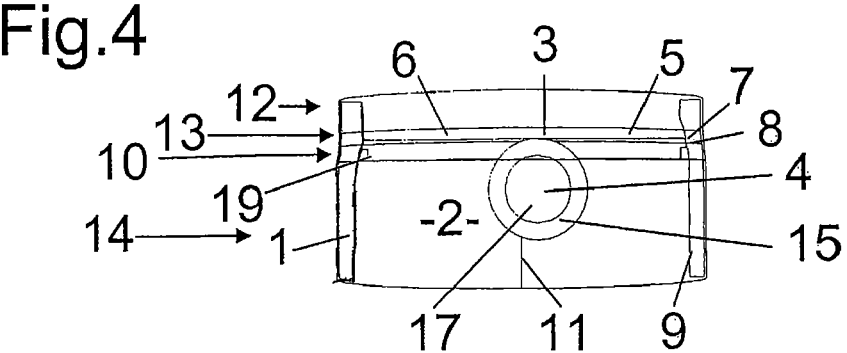
FIG. 4 shows a side view of a second throttle body assembly according to the invention, in the closed position, and in a sectioned representation.
Figure 5:
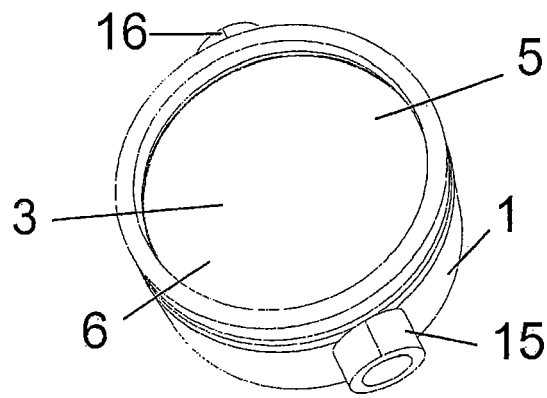
FIG. 5 shows a three-dimensional view of the throttle plate port from FIG. 4.
Figure 6:
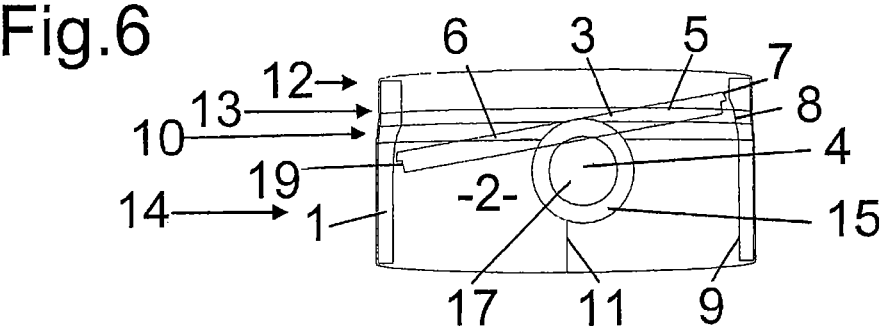
FIG. 6 shows a side view of the throttle plate port from FIG. 5 with partially opened throttle plate.
Figure 7:
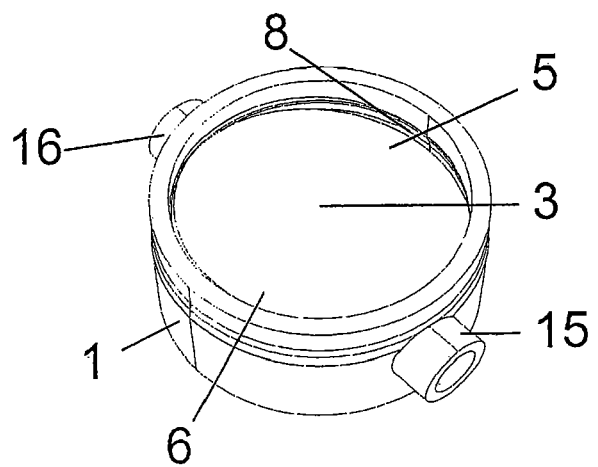
FIG. 7 shows a three-dimensional representation of the throttle body assembly according to FIG. 6.
Figure 8:
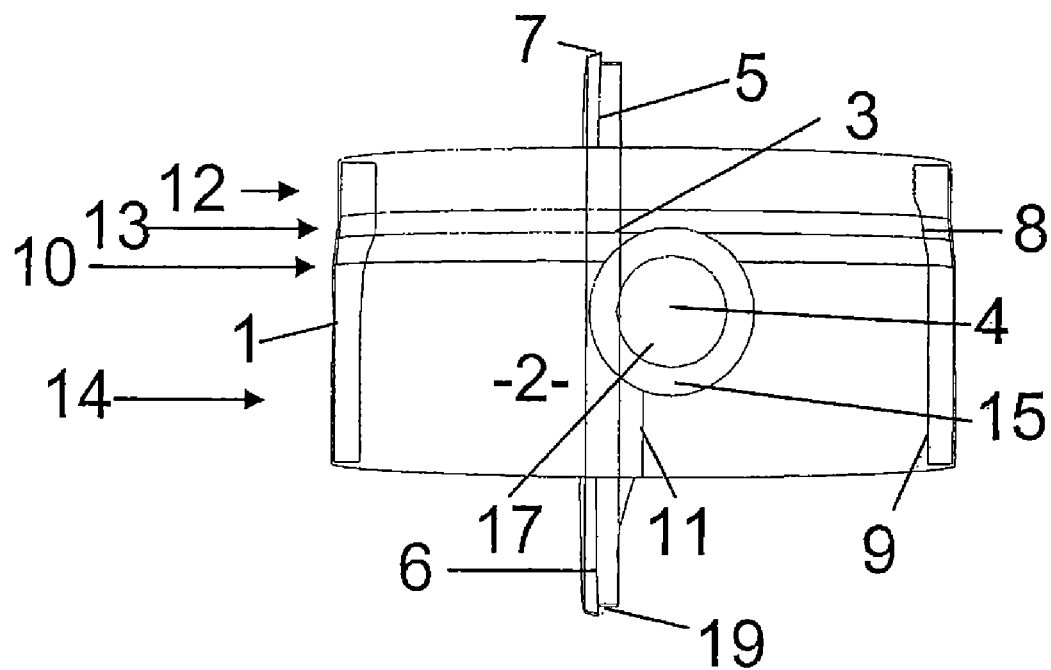
FIG. 8 shows a side view of the throttle body assembly according to FIG. 4 with a throttle plate in the completely opened position.
Figure 9:
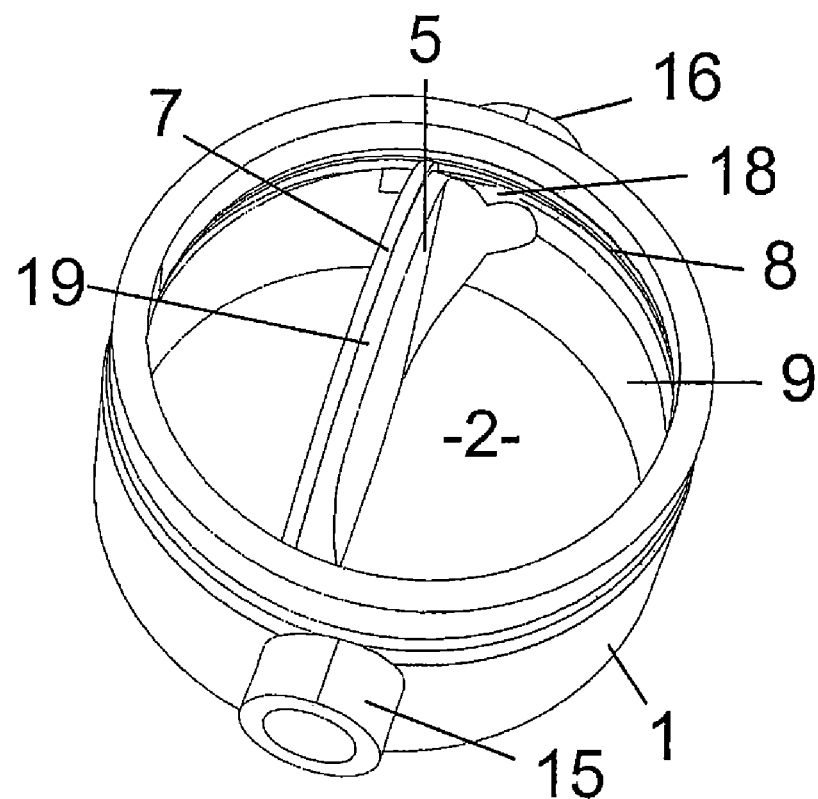
FIG. 9 shows a three-dimensional representation of the throttle body assembly according to FIG. 8.

In FIGS. 4 to 9 an additional throttle body assembly according to the invention is represented, where the throttle plate 3 is represented in the closed state in FIGS. 4 and 5, in the slightly opened state in FIGS. 6 and 7, i.e. pivoted by approximately 10°, and in FIGS. 8 and 9 in the opened state. Here the throttle plate 3 also comprises a peripheral surface 7 which is in the form of a spherical sector but is followed, in the direction of the pivot axis 4, by an additional straight peripheral surface 19 of smaller diameter. In comparison to FIGS. 1 to 3 the pivot axis 4 is disposed in the present embodiment example on the diametrically opposite side, i.e. offset to the right. It can furthermore be seen that the housing 1 is formed so as to be rotationally symmetric, whereby a shape distortion due to heat or the like is clearly reduced.

Disposed on diametrically opposite sides of the housing 1 are two bearings 15, 16 in which two stub shafts 17, 18 supporting the throttle plate 3 are disposed. The construction of these stub shafts 17, 18 can be seen in particular in FIG. 9. The stub shafts 17, 18 completely fill the bearings 15, 16 but project only for fastening the throttle plate 3 in the bore. In FIG. 9 it can accordingly be seen that in the cross section of the throttle plate 3 with a cut at the level of the pivot axis 4 and perpendicular to the throttle plate 3 an approximately U-shaped profile results. Thereby the flow resistance in bore 2 when the throttle plate 3 is opened can be kept small and nonetheless a sufficiently strong connection between the stub shafts 17, 18 and the throttle plate 3 can be created. For this purpose, care must also be taken in particular that as far as possible no additional edges arise through the connection between the stub shafts 17, 18 and the throttle plate 3 but rather there is a smooth transition from the stub shafts 17, 18 to the throttle plate 3.

Through throttle devices formed in this way it becomes possible to ensure a precise dosing of the conveyed amount of fluid as well as economical production. In addition, a complete closure of the bore 2 in the closed position of the throttle plate 3 is ensured.

It should be clear that an embodiment form of this type is not restricted to a throttle body assembly in which its parts are injection-molded in sequence in the same mold but rather other injection-molding technologies or die casting technologies can also be chosen. Here advantages in production also follow from the desired form of the housing 1.

Furthermore, it is clear that due to the eccentric pivoting motion the form of the inner wall can be adapted to the motion of the throttle plate 3 depending on the eccentricity in order to obtain changes of the free cross section which are as small as possible and thus to make possible a precise control of the amount of fluid. It is key that no undercuts are found in the entire area of the housing 1 as is customary in spherical zones but rather there is a widening which is in one direction and advances continuously everywhere. This makes possible production of a bore 2 which is of this type and through which fluid flows or of the housing 1 as well as the throttle plate 3 disposed therein in an injection-molding process in which the parts are molded in sequence in the same mold since the ejection can be accomplished without difficulties simply by withdrawing the slider. Also it is clearly possible to produce a throttle body assembly of this type in a rectangular bore with a rectangular throttle plate.

The invention claimed is:

1. A throttle body assembly for an internal combustion engine, comprising:
    (a) a housing in which a bore is formed through which a fluid can flow;
    (b) a throttle plate disposed in the housing; and
    (c) a pivot axis which divides the throttle plate into two throttle blades, wherein the pivot axis is disposed so as to be radially offset with respect to the throttle plate,
    wherein the throttle plate can be pivoted about the pivot axis, via a positioning device, so as to close the bore by abutting a seat face that is formed by an inner wall of the housing and whereby the throttle plate can be pivoted away from said seat face to open the bore,
    wherein the pivot axis is also disposed so as to be axially offset with respect to the throttle plate so that when the bore is opened a first of the two throttle blades pivots in a direction away from a cross section of the bore that runs through the pivot axis and a second of the two throttle blades pivots in a direction towards the cross section of the bore that runs through the pivot axis,
    wherein a radial peripheral surface of the throttle plate is formed, at least by sections, in the form of a sphere so that in the position that closes the bore the entire peripheral surface of the throttle plate abuts the seat face of the housing with a linear contact, and
    wherein the cross section of the bore through which fluid flows widens in a first section of the housing in an axial direction from the seat face to the pivot axis and the cross section of the bore widens in a second section of the housing on a side of the throttle plate, namely the side diametrically opposite the pivot axis, in the closed state in the direction of the pivot axis on a side of the first of the two blades, wherein widening in the first section of the housing is asymmetrical to widening in the second section of the housing.

2. Throttle body assembly for an internal combustion engine according to claim 1, wherein the first section and the second section, correspond to the area traversed in the axial direction during the pivoting motion of the throttle plate from the closed position by a pivot angle of 10°.

3. Throttle body assembly for an internal combustion engine according to claim 1, wherein the throttle plate, along with a shaft or two opposite stub shafts in the housing forming the bore, is moldable with other parts of the throttle body assembly in sequence in a same mold in at least a partially opened state.

4. Throttle body assembly for an internal combustion engine according to claim 1, wherein the throttle plate in the closed position is disposed so as to be perpendicular to the bore axis.

5. Throttle body assembly for an internal combustion engine according to claim 1, wherein the throttle plate is produced as one piece with two stub shafts that are mounted in two bearings of the housing, wherein the stub shafts are formed so that the throttle plate with sections of the stub shafts, specifically sections lying in the bore, is shaped essentially in the form of a U with one cut along a cutting plane that is at the level of the pivot axis and perpendicular through the throttle plate.

6. Throttle body assembly for an internal combustion engine according to claim 1, wherein the second section corresponds to an area traversed in the axial direction during the pivoting motion of the throttle plate from the closed position by a pivot angle of 10°.

* * * * *